(12) United States Patent
Sasaki (10) Patent No.: US 12,459,148 B2
(45) Date of Patent: Nov. 4, 2025

(54) CUTTING TOOL

(71) Applicant: TUNGALOY CORPORATION, Fukushima (JP)

(72) Inventor: Ryou Sasaki, Iwaki (JP)

(73) Assignee: TUNGALOY CORPORATION, Fukushima (JP)

( * ) Notice: Subject to any disclaimer, the term of this patent is extended or adjusted under 35 U.S.C. 154(b) by 265 days.

(21) Appl. No.: 18/309,694

(22) Filed: Apr. 28, 2023

(65) Prior Publication Data

US 2024/0025072 A1    Jan. 25, 2024

(30) Foreign Application Priority Data

Jul. 22, 2022   (JP) .................................. 2022-116845

(51) Int. Cl.
*B26D 7/08*    (2006.01)

(52) U.S. Cl.
CPC .................................. *B26D 7/088* (2013.01)

(58) Field of Classification Search
CPC ...... B26D 7/088; B23D 27/10; B23B 27/086; B23B 27/16; B23B 27/1677; B23B 2240/24; B23B 2250/12; B23B 27/00; B23B 2260/03; B23C 5/28
USPC .......................................................... 83/169
See application file for complete search history.

(56) References Cited

U.S. PATENT DOCUMENTS

| | | | | |
|---|---|---|---|---|
| 4,213,354 A | * | 7/1980 | Dahinden | B23Q 11/1015 82/900 |
| 5,148,728 A | * | 9/1992 | Mazurkiewicz | B23Q 11/10 407/11 |
| 5,388,487 A | * | 2/1995 | Danielsen | B23Q 11/10 82/158 |
| 6,471,448 B1 | * | 10/2002 | Lagerberg | B23Q 11/10 407/11 |
| 8,388,268 B2 | * | 3/2013 | Henry | B23B 27/10 407/101 |
| 9,138,847 B2 | * | 9/2015 | Yeh | B23Q 11/1015 |
| 9,427,807 B2 | * | 8/2016 | Flolo | B23B 27/1666 |
| 9,586,263 B2 | * | 3/2017 | Frota de Souza Filho | B23B 29/12 |
| 9,931,699 B2 | * | 4/2018 | Kitagawa | B23B 27/10 |
| 2003/0223831 A1 | * | 12/2003 | Viens | B23Q 11/145 408/60 |
| 2008/0131215 A1 | * | 6/2008 | Sjoo | B23B 29/043 407/117 |
| 2011/0318123 A1 | * | 12/2011 | Leishman | B23Q 11/10 165/104.19 |
| 2012/0082518 A1 | | 4/2012 | Woodruff et al. | |

(Continued)

FOREIGN PATENT DOCUMENTS

| | | |
|---|---|---|
| DE | 10 2018 113 213 A1 | 12/2018 |
| EP | 3 991 886 A1 | 5/2022 |

(Continued)

*Primary Examiner* — Ghassem Alie
(74) *Attorney, Agent, or Firm* — Studebaker Brackett PLLC (57) ABSTRACT

A cutting tool with a simple configuration is provided which can cause a fluid to reliably hit a cutting edge. The cutting tool includes a holder, a cutting insert having a cutting edge and mounted on the holder, and an ejecting portion which ejects a fluid from several ejection ports toward the cutting edge. The ejection ports eject the fluid toward a region including the cutting edge and extending in a predetermined direction.

5 Claims, 6 Drawing Sheets

(56) References Cited

U.S. PATENT DOCUMENTS

| | | |
|---|---|---|
| 2014/0030033 A1 | 1/2014 | Luik et al. |
| 2016/0236281 A1 | 8/2016 | Kitagawa |
| 2018/0318935 A1 | 11/2018 | Kobayashi et al. |
| 2018/0369923 A1 | 12/2018 | Chen et al. |
| 2020/0180040 A1 | 6/2020 | Andoh |
| 2020/0254528 A1 | 8/2020 | Luik |
| 2023/0219143 A1 | 7/2023 | Harada et al. |

FOREIGN PATENT DOCUMENTS

| | | | |
|---|---|---|---|
| JP | H10-094904 A | 4/1998 | |
| JP | 2014-509563 A | 4/2014 | |
| JP | 2021-037568 A | 3/2021 | |
| JP | 2021-088026 A | 6/2021 | |
| KR | 10-2014-0102860 A | 8/2014 | |
| WO | WO-0115840 A1 * | 3/2001 | ............ B23B 27/10 |
| WO | 2015/056496 A1 | 4/2015 | |
| WO | 2017/018369 A1 | 2/2017 | |
| WO | 2019/211043 A1 | 11/2019 | |
| WO | 2021/255851 A1 | 12/2021 | |

* cited by examiner

CUTTING TOOL

BACKGROUND

Field

The present invention relates to a cutting tool for machining a work material.

Description of Related Art

When a work material of metal or the like is to be machined by a cutting tool, a fluid such as a coolant, for example, is supplied toward a cutting edge in some cases. The fluid is supplied for the purpose of discharge promotion of chips, cooling of the cutting tools and work materials, lubrication, rust-proofing, and the like. As described in WO 2017/018369, the fluid is ejected from an ejection port provided in the vicinity of the cutting edge toward a position of the cutting edge.

SUMMARY

A position of the cutting edge in a holder is changed in some cases in accordance with a shape of the work material. For example, the position of the cutting edge can be changed by replacing a mounting member interposed between the holder and the cutting edge or by replacing the holder itself.

When the position of the cutting edge is changed, the fluid does not hit the cutting edge, unless a direction in which the fluid is ejected from the ejection port is also changed. However, if a mechanism for adjusting the direction of the ejection port is provided separately, a structure of the cutting tool becomes complicated.

The present invention has an object to provide a cutting tool which can cause the fluid to reliably hit the cutting edge even with a simple configuration.

A cutting tool according to the present invention is a cutting tool for machining a work material, includes a holder, a cutting insert having a cutting edge and mounted on the holder, and an ejecting portion which ejects a fluid from the ejection port toward the cutting edge. The ejection port is formed so as to eject the fluid toward a region including the cutting edge and extending in a predetermined direction.

In the cutting tool having the configuration described above, the fluid ejected from the ejection port is ejected toward the region including the cutting edge and extending in the predetermined direction. That is, the ejection port of the ejecting portion is configured such that the fluid goes toward the region extending long in the predetermined direction, not that the fluid goes toward the cutting edge at a pin point.

The position of the cutting edge is changed within a range along the "region" described above in accordance with the shape of the work material. Thus, the ejection port of the ejecting portion can be configured so that the fluid goes toward the region in the range where the position of the cutting edge can be changed. By having such configuration, even after the position of the cutting edge is changed, the fluid ejected from the ejection port can be continuously caused to go toward the cutting edge.

Moreover, if the cutting tool is used for grooving or cutting-off, for example, the elongated region to which the fluid ejected from the ejection port goes can be a region along a groove formed in the work material. In this case, since an amount of the fluid reaching an inner side of the groove increases, such an effect is also exerted that the aforementioned function of the fluid can be sufficiently produced.

As another preferable aspect, in the ejecting portion, a plurality of ejection ports may be formed so as to be aligned in a predetermined aligning direction.

Regarding the shape of the ejection port, by assuming that a region linearly extended along a direction in which the fluid is ejected from the ejection port is an ejection region, as another preferable aspect, the ejecting portion may be configured so as not to overlap the ejection region extending from at least one other ejection port on a front side of the cutting edge.

As another preferable aspect, a straight line passing through the cutting edge and extending in the predetermined direction and a straight line passing through the ejection port and extending in the aligning direction may be both included in a common plane.

As another preferable aspect, the shape of each of the ejection ports may be such a shape that a longitudinal direction thereof is along the aligning direction.

As another preferable aspect, the number of the ejection ports may be three or more.

As another preferable aspect, the ejecting portion may be mounted on the holder.

As another preferable aspect, the cutting insert may be mounted on the holder through a mounting member.

According to the present invention, even with a simple configuration, the cutting tool which can cause the fluid to reliably hit the cutting edge is provided.

DETAILED DESCRIPTION

Hereinafter, this embodiment will be explained with reference to the attached drawings. In order to facilitate understanding of the explanation, the same signs are given to the same constituent elements as much as possible in each of the drawings, and duplicated explanation will be omitted.

A configuration of a cutting tool 10 according to this embodiment will be explained mainly by referring to FIG. 1. The cutting tool 10 is a cutting tool for performing grooving or cutting-off. The cutting tool 10 includes a holder 20, a mounting member 30, a cutting insert 40, and an ejecting portion 50.

The holder 20 is a portion for holding the mounting member 30 and the ejecting portion 50 described above in the cutting tool 10. In FIG. 1, only a leading end portion where the cutting insert 40 and the like in the holder 20 are provided is illustrated, and a rear end portion on a side opposite thereto is not shown. When machining is performed by the cutting tool 10, the rear end portion of the holder 20 is gripped by a tool rest of a machine tool, not shown.

Inside the holder 20, a flow path, not shown, through which a coolant, which is a fluid, passes, is formed. An end portion on an upstream side of the flow channel is opened in the rear end portion of the holder 20 and receives the coolant supplied from the machine tool. An end portion on a downstream side of the flow path connects to the ejecting portion 50 described later. The opening described above, which is the upstream-side end portion of the flow path, may be provided in a side surface of the holder 20. Moreover, the opening may be provided at a plurality of spots on a rear end or a side surface of the holder 20.

The mounting member 30 is a plate-shaped member mounted on the holder 20. In the mounting member 30, an insert pocket 31 is formed, and a cutting insert 40 is held in the insert pocket 31. In the mounting member 30, three pieces of the insert pockets 31 in total are formed, and the cutting insert 40 is held in one insert pocket 31 of them. The mounting member 30 is fastened and fixed by a plurality of screws in a state fitted in a recessed part formed on a side surface of the holder 20.

The cutting insert 40 is a part biting into the work material during machining and cutting the work material. An edge part formed on a leading end of the cutting insert 40 is a cutting edge 41 for machining. As described above, in this embodiment, the cutting edge 41 is a part of the cutting insert 40, and is mounted on the holder 20 through the mounting member 30, which is a mounting member.

Figure 2:
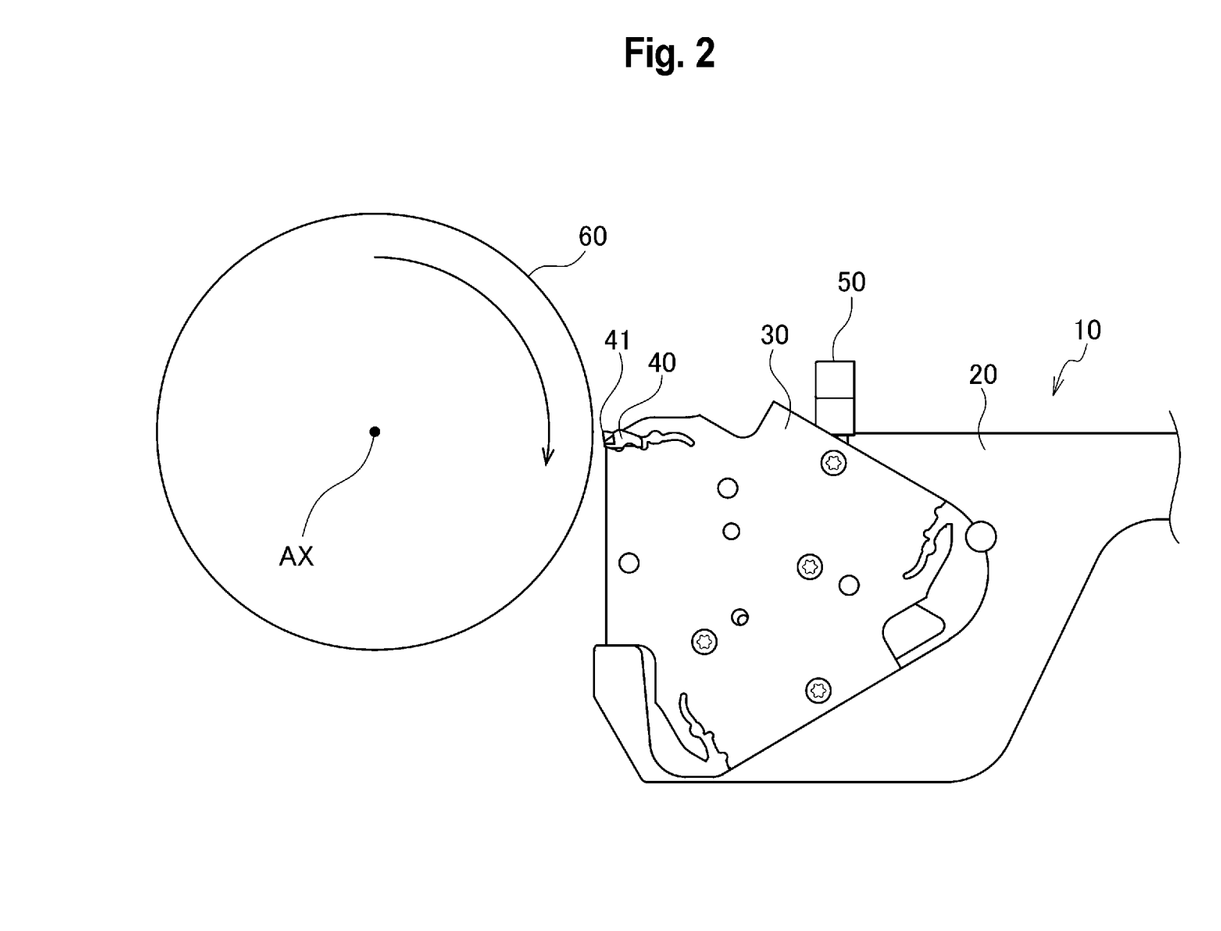
FIG. 2 is a diagram schematically illustrating a state where a work material is machined by the cutting tool according to this embodiment.

FIG. 2 schematically illustrates a state when a work material 60 is machined by the cutting tool 10. The work material 60 has a substantially columnar shape, and a central axis AX thereof is caused to follow a depth direction of a paper surface. The work material 60 is held by a chuck of a spindle held by a driving device, not shown, and is rotated in an arrow direction in FIG. 2 around the central axis AX. As described above, the holder 20 of the cutting tool 10 is held by the machine tool, not shown.

When the cutting tool 10 is moved toward the work material 60 from the state in FIG. 2, the cutting edge 41 bites into the side surface of the work material 60, and a groove is formed along a peripheral direction in the work material 60. A depth of the groove is adjusted by a moving amount of the work material 60. When the central axis AX of the work material 60 is moved to the position of the cutting edge 41, so-called "cutting-off" is performed, and the work material 60 is cut off.

When the machining of the work material 60 is being performed, the work material 60 is rotated at a high speed, and the cutting edge 41 is moved toward the central axis AX little by little. As a result, the cutting edge 41 moves relatively to the surface of the work material 60 (specifically, a part in the work material 60, into which the cutting edge 41 bites). A dotted line DL1 shown in FIG. 1 is a line indicating a direction in which the cutting edge 41 relatively moves. This direction is also referred to simply as a "moving direction" below. The dotted line DL1 is substantially equal to a tangent line passing through an outer periphery of the work material 60 when viewed along the central axis AX as in FIG. 2. The "moving direction" above may be defined as a linear direction such as the dotted line DL1 but may be also defined as a circular-arc-shaped direction along the outer peripheral surface (bottom surface of the groove during the machining) of the work material 60. In any case, the "moving direction" is a direction perpendicular to the central axis AX and within a virtual plane including the dotted line DL1. The "moving direction" can be also considered to be a direction in which the cutting edge 41 moves relatively to the work material 60 accompanying a rotating operation of the work material 60.

Figure 3:
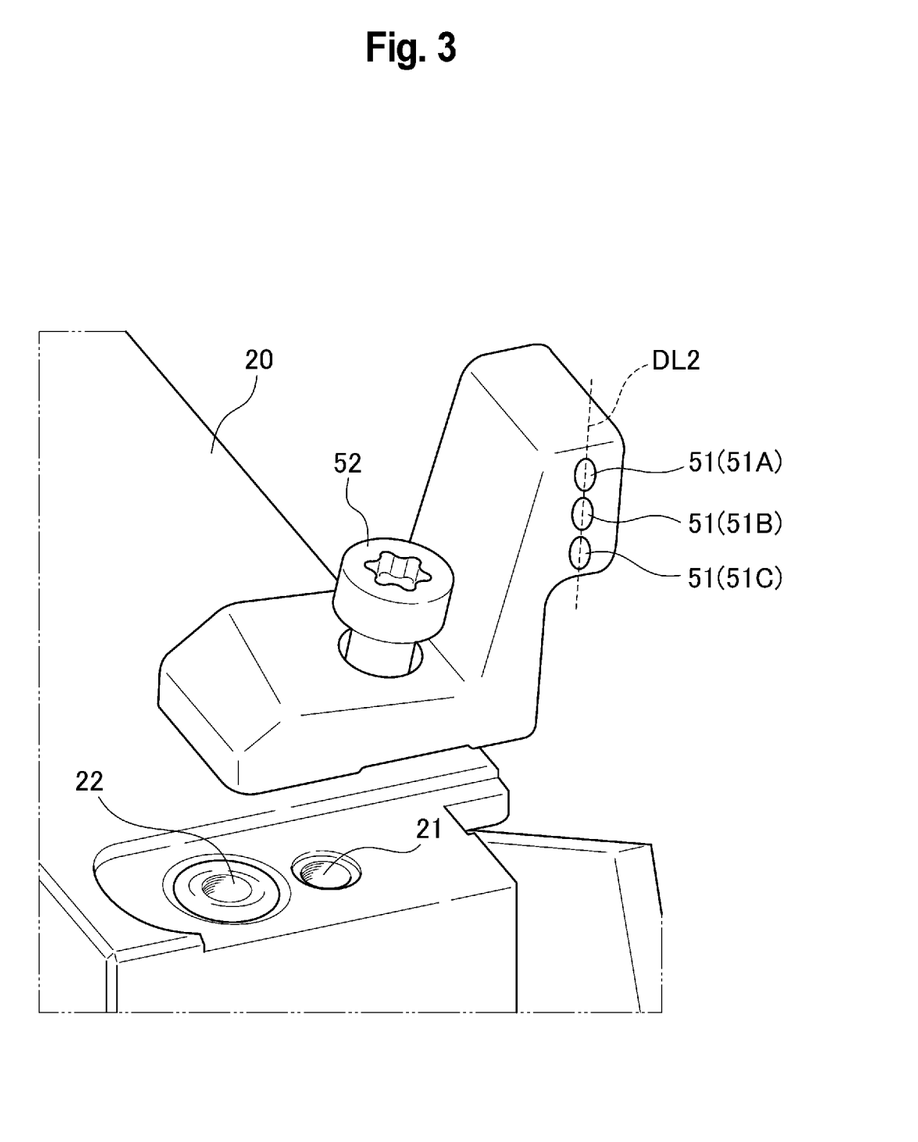
FIG. 3 is a view illustrating a configuration of an ejecting portion of the cutting tool according to this embodiment.

The ejecting portion 50 is a part which ejects a coolant toward the cutting edge 41 of the cutting insert 40. FIG. 3 illustrates a configuration of a vicinity part of the ejecting portion 50 as an exploded assembly diagram. As shown in the figure, three ejection ports 51 are formed in the ejecting portion 50, and the coolant is ejected from each of the ejection ports 51. The number of the ejection ports 51 may be two or less but preferably three or more.

The ejection port 51 formed on the farthest side from the holder 20 will be also referred to as an "ejection port 51A" in the following. The ejection port 51 formed on the closest side to the holder 20 will be also referred to as an "ejection port 51C" in the following. The ejection port 51 formed between the ejection port 51A and the ejection port 51C is also referred to as an "ejection port 51B" in the following. In this embodiment, these three ejection ports 51 are disposed so as to be aligned linearly along a dotted line DL2. The dotted line DL2 is a straight line passing through a center of each of the ejection ports 51A, 51B, 51C and a straight line perpendicular to an upper surface of the holder 2 in FIGS. 1 and 3. A direction indicated by the dotted line DL2 corresponds to an "aligning direction" in this embodiment.

The dotted line DL2 is a line included in the "virtual plane" described above, that is, a virtual plane which is perpendicular to the central axis AX, and includes the dotted line DL1. That is, in this embodiment, each of the ejection ports 51 is disposed such that the straight line (DL1) passing through the cutting edge 41 and extending in the moving direction and the straight line (DL2) passing through the ejection port 51 and extending in the predetermined aligning direction are both included in the common plane. Instead of the aspect as above, there may be such an aspect that center positions of some of the ejection ports 51 are slightly shifted from the dotted line DL2.

In this embodiment, a shape of each of the ejection ports 51 is an oval shape, and a long axis thereof is disposed so as to be parallel to the dotted line DL2. That is, each of the ejection ports 51 has a shape whose longitudinal direction is along the dotted line DL2 (aligning direction). The shape of the ejection port 51 only needs to be a shape whose longitudinal direction is along the dotted line DL2 and may be a shape different from the "ovel" as in this embodiment. For example, the shape of the ejection port 51 may be a "long hole" extending along the dotted line DL2.

As shown in FIG. 3, the ejecting portion 50 is fastened and fixed to the upper surface of the holder 20 by a screw 52. In a part of the holder 20 where the ejecting portion 50 is mounted, a screw hole 21 and a channel hole 22 are formed. The screw hole 21 is a hole through which the screw 52 is inserted. The channel hole 22 is an end portion on a downstream side of the channel formed inside the holder 20.

Inside the ejecting portion 50, a channel, not shown, for guiding the coolant supplied from the channel hole 22 to the respective ejection ports 51 is formed. The coolant supplied from the machine tool passes through the channel in the holder 20 and then, passes through the channel in the ejecting portion 50 and is ejected from the respective ejection ports 51.

Figure 4:
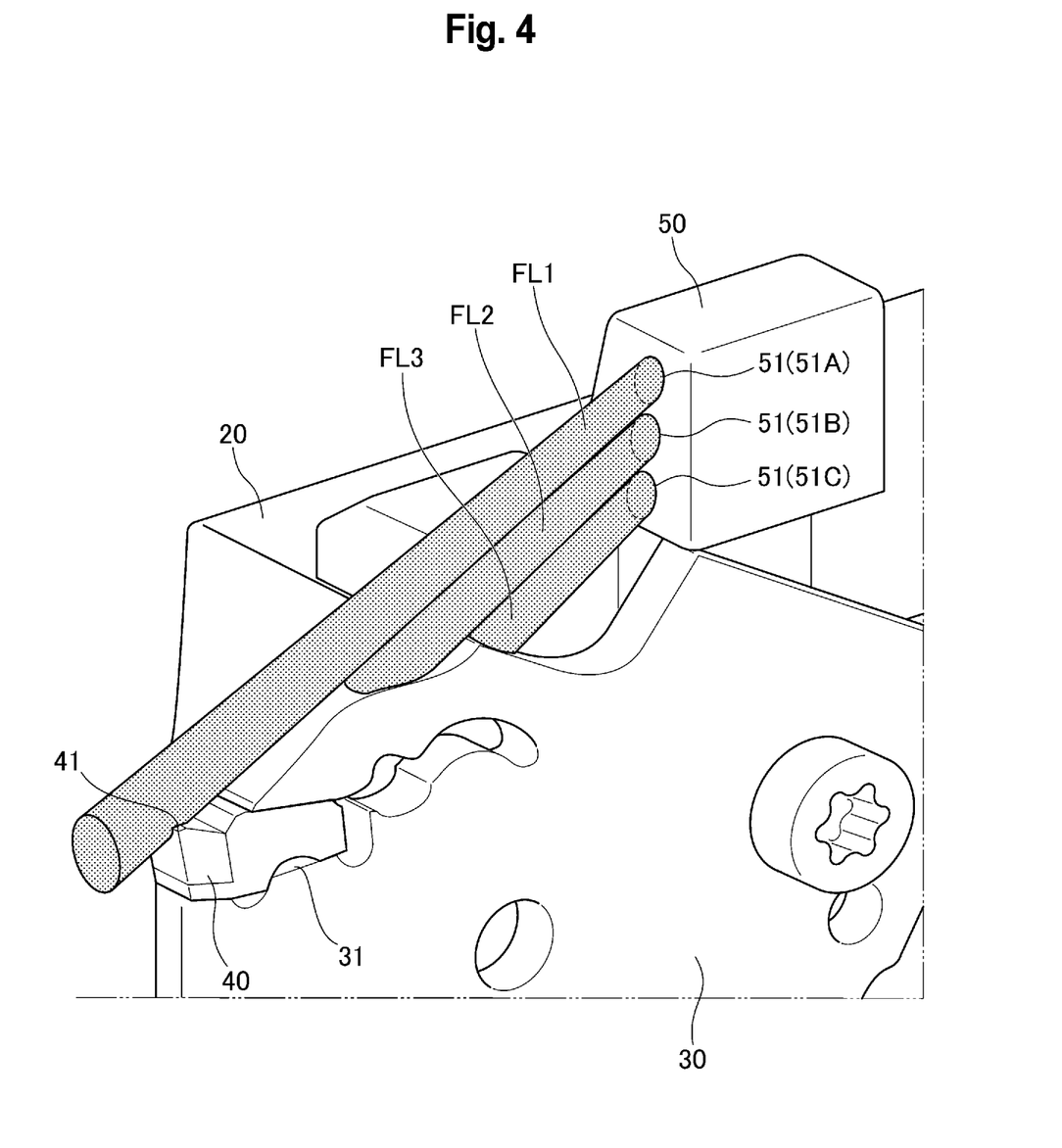
FIG. 4 is a view illustrating a flow of a fluid ejected from the ejecting portion.

FIG. 4 schematically illustrates a state where the coolant is ejected from the respective ejection ports 51 during machining. Reference character FL1 denotes a flow of the coolant ejected from the ejection port 51A. Reference character FL2 denotes a flow of the coolant ejected from the ejection port 51B. Reference character FL3 denotes a flow of the coolant ejected from the ejection port 51C. Reference characters FL1, FL2, and FL3 indicate a flow of a case in which a flow velocity of the coolant is sufficiently large and is linearly ejected along the central axis of each of the ejection ports 51.

Figure 1:
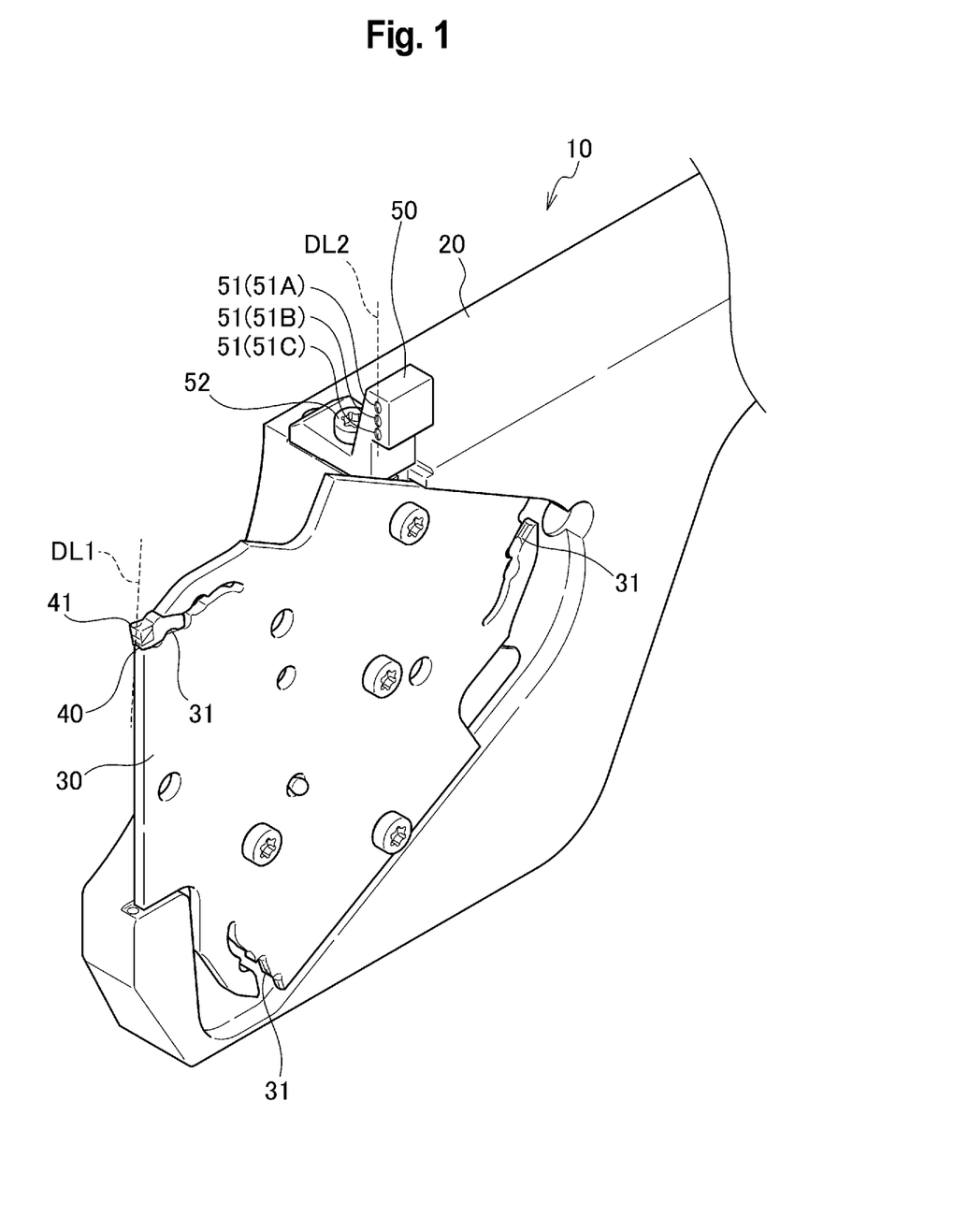
FIG. 1 is a view illustrating an entire configuration of a cutting tool according to this embodiment.

As described above, the three ejection ports 51 are aligned in one line along the dotted line DL2 in FIG. 1. Thus, a region toward which the cooling ejected from the ejection port 51 goes is an elongated region extending in a specific direction. Specifically, the coolant is ejected toward the elongated region including the cutting edge 41 and extending in the moving direction (DL1). Each of FL1, FL2, FL3 only needs to be a flow toward each part in such one "region" or may be a flow reaching the work material while being separated from one another.

In an example shown in FIG. 4, only the coolant (FL1) ejected from the ejection port 51A directly hits the cutting edge 41, while the coolants (FL2, FL3) ejected from the other ejection ports 51B, 51C do not directly hit the cutting edge 41. The coolant ejected from the ejection port 51A does not merge with the coolants ejected from the other ejection ports 51B, 51C at least until it reaches the cutting edge 41. Since the coolant of the FL1 directly reaches the cutting edge 41 without weakening, ejection performances of chips can be sufficiently exerted.

Here, a region in which the shape of the ejection port 51 is linearly extended along a direction in which the coolant is ejected from the ejection port 51 is defined as an "ejection region". The ejection region can be considered to be a region where the coolant flows, when it is assumed that there is no spread or scattering of the coolant, a fall or the like by an influence of the gravity after ejection from the ejection port 51.

In order to realize the flows of the coolants not merging with each other as described above, the ejection region extending from the ejection port 51A only needs to constitute the ejecting portion 50 so that it does not overlap the ejection regions extending from the other ejection ports 51B, 51C on the front side of the cutting edge 41. The respective ejection regions extending from the ejection ports 51B, 51C may overlap each other or do not have to.

The flow of the coolant (FL1) directly hitting the cutting edge as above may be one flow as in this embodiment but may be two or more.

As described above, in this embodiment, the straight line (DL1) passing through the cutting edge 41 and extending in the moving direction and the straight line (DL2) passing through the ejection port 51 and extending in the predetermined aligning direction are both included in the common plane. As a result, all the coolants ejected from the respective ejection ports 51 go toward the groove formed in the work material 60, and many of them go into the inside of the groove. Thus, the functions of the coolant described above such as ejection of the chips, cooling of the work material 60 and the like can be further sufficiently exerted. The "straight line passing through the cutting edge 41 and extending in the moving direction" described above only needs to be a straight line passing through an arbitrary point on the cutting edge 41. Moreover, the "straight line passing through the ejection port 51 and extending in the predetermined aligning direction" only needs to be a straight line passing through an arbitrary point (may be a point other than the center) on an inner side of the ejection port 51.

By the way, when the work material 60 with a shape different from that in the example in FIG. 4 is to be machined, it is preferable that the position of the cutting edge 41 in the cutting tool 10 is changed in accordance with the shape of the work material 60.

Figure 5:
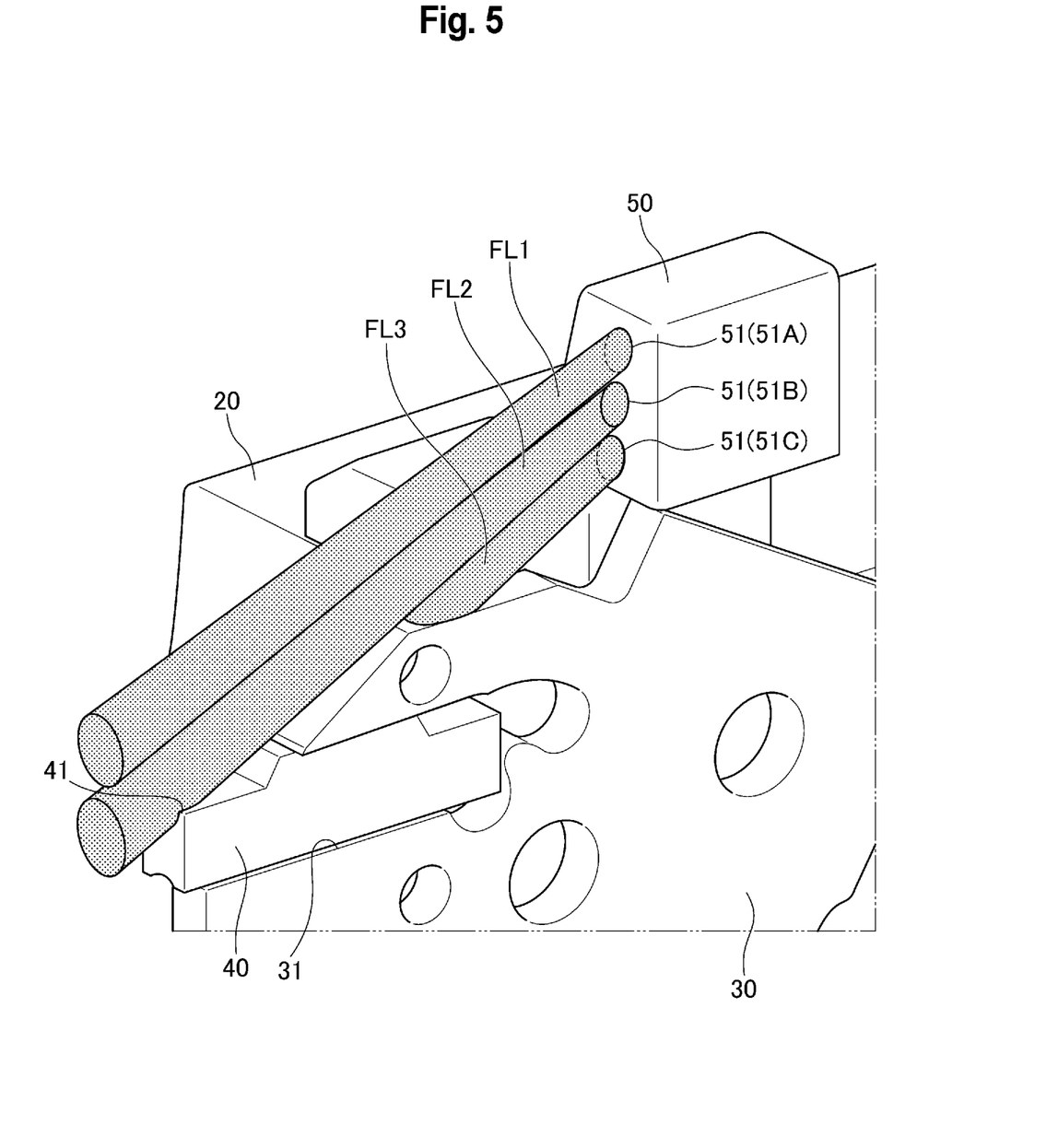
FIG. 5 is a view illustrating the flow of the fluid ejected from the ejecting portion.

FIG. 5 illustrates an example when the holder 20 and the mounting member 30 are replaced with those with smaller sizes than those in the example in FIG. 4 in order to machine the work material 60 with a diameter smaller than that in the example in FIG. 4. The cutting insert 40 in FIG. 5 was replaced with the one with a size larger than that in the example in FIG. 4. In this example, the position of the cutting edge 41 is a position closer to the ejecting portion 50 than that in the example in FIG. 4. When the position of the cutting edge 41 is to be changed in accordance with the shape of the work material 60, only the mounting member 30 may be replaced while the holder 20 is kept as it is. In any case, a common member is used as the ejecting portion 50.

When the position of the cutting edge 41 is changed as in FIG. 5, the coolant (FL1) ejected from the ejection port 51A does not hit the cutting edge 41 anymore. On the other hand, the coolant (FL2) ejected from the ejection port 51B hits the cutting edge 41. The coolant ejected from the ejection port 51B does not merge with the coolants ejected from the other ejection ports 51A, 51C at least until it reaches the cutting edge 41.

In order to realize the flows of the coolants which do not merge with each other as described above, it is only necessary to configure the ejecting portion 50 such that the ejection region extending from the ejection port 51B does not overlap the ejection regions extending from the other ejection ports 51A, 51C on the front side of the cutting edge 41. The respective ejection regions extending from the ejection ports 51A, 51C may overlap each other or do not have to overlap.

Figure 6:
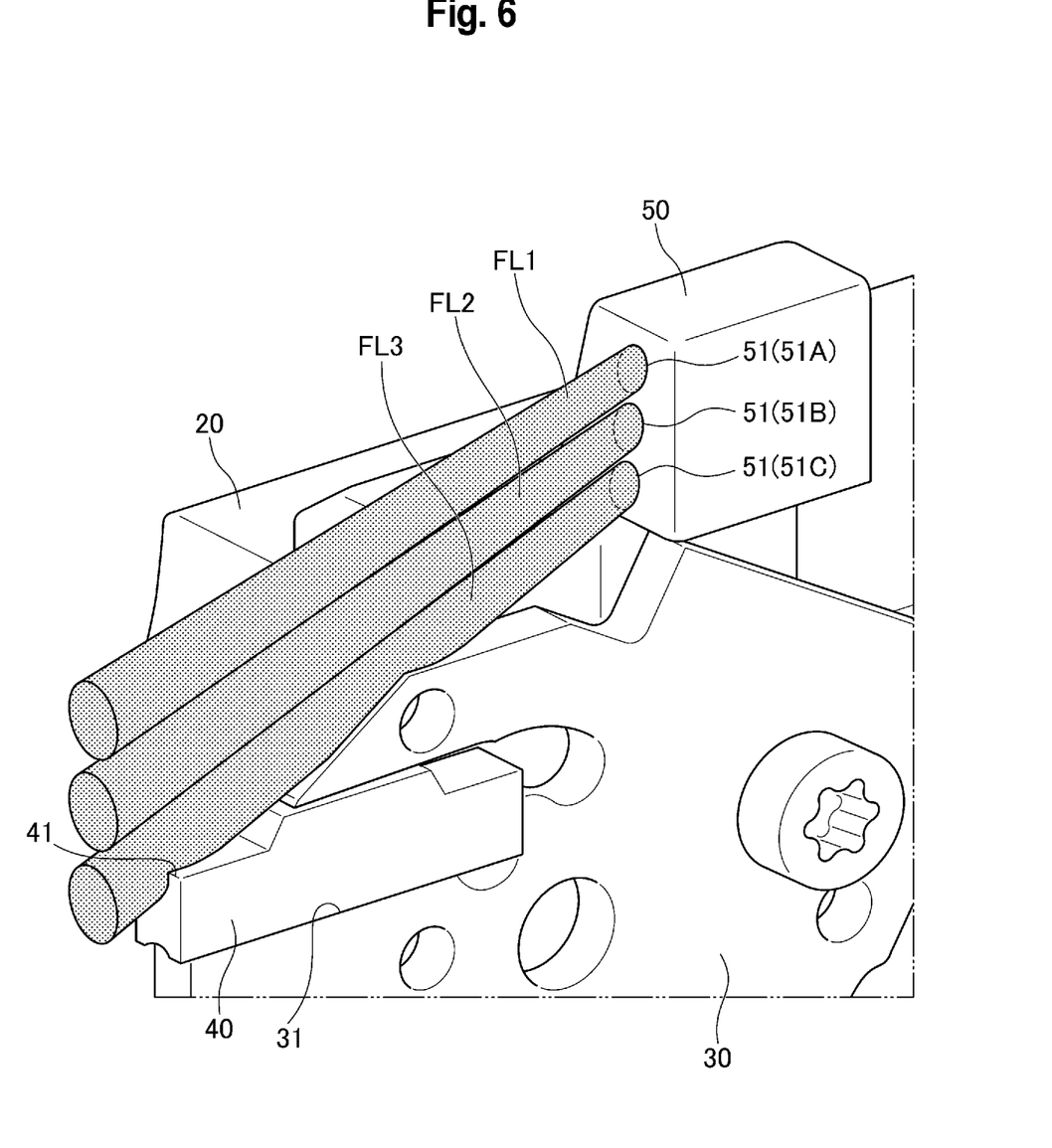
FIG. 6 is a view illustrating the flow of the fluid ejected from the ejecting portion.

FIG. 6 illustrates an example of a case where the holder 20, the mounting member 30, and the cutting insert 40 were replaced with those with further smaller sizes than those in the example in FIG. 5 in order to machine the work material 60 with a diameter further smaller than that in the example in FIG. 5. In this example, the position of the cutting edge 41 is a position further closer to the ejecting portion 50 than that in the example in FIG. 5.

When the position of the cutting edge 41 is changed as in FIG. 6, the coolant (FL2) ejected from the ejection port 51B does not hit the cutting edge 41 anymore. On the other hand, the coolant (FL3) ejected from the ejection port 51C hits the cutting edge 41. The coolant ejected from the ejection port 51C does not merge with the coolants ejected from the other ejection ports 51A, 51B at least until it reaches the cutting edge 41.

In order to realize the flows of the coolants which do not merge with each other as described above, it is only necessary to configure the ejecting portion 50 such that the ejection region extending from the ejection port 51C does not overlap the ejection regions extending from the other ejection ports 51A, 51B on the front side of the cutting edge 41. The respective ejection regions extending from the ejection ports 51A, 51B may overlap each other or do not have to overlap.

As described above, in the cutting tool 10 according to this embodiment, the state where the coolant hits the cutting edge 41 can be ensured all the time without changing the configuration of the ejecting portion 50 or providing a mechanism for changing the direction of the ejection. Such a function is realized since the ejection port 51 of the ejecting portion 50 is formed so that the coolant is ejected toward the elongated region extending in the moving direction in accordance with the range in which the position of the cutting edge 41 can be changed.

The ejection port 51 of the ejecting portion 50 may be provided in plural as in this embodiment, but it may be such an aspect that only one ejection port 51 is provided. In this case, the single ejection port 51 only needs to be formed having an elongated shape as it extends along the dotted line DL1 in FIG. 1.

When a plurality of the ejection ports 51 are provided as in this embodiment, the shape of each of the ejection ports 51 may be circular, for example. However, it is more preferable that the shape of each of the ejection ports 51 is a shape whose longitudinal direction is along the aligning direction of the dotted line DL2 as in this embodiment, since, while a supply amount of the coolant is increased, most of them can be caused to go toward the inside of the groove.

In this embodiment, the position of the cutting edge 41 can be selected from three positions shown in each of FIGS. 4, 5, 6, and the number and the direction of the three ejection ports 51 are adjusted in advance correspondingly to the respective positions. As described above, the number and the like of the ejection ports 51 only need to be adjusted in accordance with the selectable number as the position of the cutting edge 41.

The ejecting portion 50 in this embodiment is, as explained with reference to FIG. 3 and the like, constituted as the members mounted on the holder 20 (that is, removable members). Instead of the aspect as above, it may be such an aspect that the ejecting portion 50 is integrally constituted with the holder 20.

This embodiment has been explained as above with reference to the specific examples. However, this disclosure is not limited to these specific examples. Those to which design changes were added as appropriate by those skilled in the art are also included in the scope of this disclosure as long as the features of this disclosure are provided. Each of the elements, dispositions, conditions, shapes and the like thereof in each of the specific examples described above are not limited to those exemplified but can be changed as appropriate. Combination of each element provided in each of the specific examples described above can be changed as appropriate as long as technical conflict does not occur.

What is claimed is:

1. A cutting tool for machining a work material, comprising:
    a holder;
    a cutting insert having a cutting edge and mounted on the holder; and
    an ejecting portion which ejects a fluid from a plurality of ejection ports toward the cutting edge, wherein
    the plurality of ejection ports are aligned linearly in a predetermined aligning direction such that the fluid is ejected toward a region including the cutting edge and extending in a predetermined direction,
    the aligning direction is defined by a straight line passing through a center of each of the plurality of ejection ports and perpendicular to an upper surface of the holder,
    each ejection port of the plurality of ejection ports has an ejection region which extends linearly along a direction in which the fluid is ejected therefrom,
    the ejecting portion is configured such that the ejection region extending from one of the plurality of ejection ports does not overlap the ejection region extending from another one of the plurality of ejection ports on a front side of the cutting edge,
    the cutting insert is mounted on the holder through a mounting member, and
    the mounting member has a plurality of insert pockets and the cutting insert is held in one insert pocket among the plurality of insert pockets.

2. The cutting tool according to claim 1, wherein a straight line passing through the cutting edge and extending in the predetermined direction and the straight line defining the aligning direction are both included in a common plane.

3. The cutting tool according to claim 1, wherein a shape of each of the plurality of ejection ports is such that a longitudinal direction thereof is along the aligning direction.

4. The cutting tool according to claim 1, wherein the plurality of ejection ports comprises three ejection ports.

5. The cutting tool according to claim 1, wherein the ejecting portion is mounted on the holder.

* * * * *